(12) United States Patent
Jacob et al.

(10) Patent No.: US 10,640,860 B2
(45) Date of Patent: May 5, 2020

(54) LASER METAL DEPOSITION METHODOLOGY ON GRAPHITE SUBSTRATES FOR AEROSPACE COMPONENTS

(71) Applicant: Rosemount Aerospace Inc., Burnsville, MN (US)

(72) Inventors: Robin Jacob, Karnataka (IN); Guru Prasad Mahapatra, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 16/175,125

(22) Filed: Oct. 30, 2018

(65) Prior Publication Data

US 2020/0087769 A1 Mar. 19, 2020

(30) Foreign Application Priority Data

Sep. 13, 2018 (IN) .............................. 201811034577

(51) Int. Cl.
| | |
|---|---|
| C23C 2/04 | (2006.01) |
| C23C 24/10 | (2006.01) |
| B23K 26/32 | (2014.01) |
| B23K 35/00 | (2006.01) |
| B23K 103/18 | (2006.01) |
| B23K 103/00 | (2006.01) |

(52) U.S. Cl.
CPC ................ *C23C 2/04* (2013.01); *B23K 26/32* (2013.01); *B23K 35/004* (2013.01); *C23C 24/10* (2013.01); *B23K 2103/26* (2018.08); *B23K 2103/50* (2018.08)

(58) Field of Classification Search
CPC .. C23C 2/04; C23C 2/02; C23C 24/10; C23C 24/103; B23K 26/32; B23K 26/324; B23K 26/60; B23K 35/002; B23K 35/003
See application file for complete search history.

(56) References Cited

U.S. PATENT DOCUMENTS

| | | | |
|---|---|---|---|
| 8,124,245 B2 | 2/2012 | Budinger et al. | |
| 9,719,820 B1 | 8/2017 | Jacob et al. | |
| 9,758,876 B2 | 9/2017 | Shorey et al. | |
| 2009/0047439 A1* | 2/2009 | Withers | B22D 23/003 427/448 |
| 2018/0099358 A1 | 4/2018 | Hart et al. | |

(Continued)

FOREIGN PATENT DOCUMENTS

| | | |
|---|---|---|
| EP | 3048408 A1 | 7/2016 |
| EP | 3076185 A1 | 10/2016 |
| EP | 3133403 A1 | 2/2017 |

(Continued)

OTHER PUBLICATIONS

European Search Report Issued in European Application No. 19196766.0 dated Feb. 12, 2020; 7 Pages.

*Primary Examiner* — Michael P Wieczorek
(74) *Attorney, Agent, or Firm* — Cantor Colburn LLP

(57) ABSTRACT

A laser direct metal deposition method for a graphite substrate is provided. The laser direct metal deposition method includes creating an assembling by sliding an outer sheath over the graphite substrate. Further, laser direct metal deposition method includes performing a laser scanning of the outer sheath and performing a laser metal deposition over the graphite substrate with the outer sheath.

10 Claims, 5 Drawing Sheets

(56) References Cited

U.S. PATENT DOCUMENTS

2018/0112938 A1 4/2018 Mahapatra et al.
2018/0143049 A1 5/2018 Gordon et al.

FOREIGN PATENT DOCUMENTS

| EP | 3190419 A1 | 7/2017 |
| EP | 3199955 A1 | 8/2017 |
| FR | 3042065 A1 | 4/2017 |

* cited by examiner

LASER METAL DEPOSITION METHODOLOGY ON GRAPHITE SUBSTRATES FOR AEROSPACE COMPONENTS

CROSS-REFERENCE TO RELATED APPLICATIONS

This application claims the benefit of Indian Application Serial No. 201811034577 filed Sep. 13, 2018, which is incorporated herein by reference in its entirety.

BACKGROUND

Presently, during additive manufacturing, laser metal deposition trials of hybrid material Pitot tube, it is found that metal deposition is not happening over the graphite substrate. The melt pool cannot be created on a graphite surface at atmospheric pressure since graphite will sublimate at high temperatures instead of melting. Thus, there is a need for a reliable method to deposit metal over graphite substrate.

BRIEF DESCRIPTION

In accordance with one or more embodiments, a laser direct metal deposition method for a graphite substrate is provided. The laser direct metal deposition method includes creating an assembly by sliding an outer sheath over the graphite substrate. Further, laser direct metal deposition method includes performing a laser scanning of the outer sheath and performing a laser metal deposition over the graphite substrate with the outer sheath.

In accordance with one or more embodiments or the laser direct metal deposition method embodiment above, the graphite substrate can be prepared without metal plating.

In accordance with one or more embodiments or the laser direct metal deposition method embodiment above, the graphite substrate can be prepared by plating with one or more metals including Nickel or Chromium to prevent oxidation.

In accordance with one or more embodiments or any of the laser direct metal deposition method embodiments above, the outer sheath can act as interface for a laser metal deposition molten pool.

In accordance with one or more embodiments or any of the laser direct metal deposition method embodiments above, the outer sheath can include a metallic interface metal.

In accordance with one or more embodiments or any of the laser direct metal deposition method embodiments above, a thickness of the outer sheath can be determined based on a thickness of a melt pool.

In accordance with one or more embodiments or any of the laser direct metal deposition method embodiments above, the outer sheath can be mechanically restrained in place over the graphite substrate during the laser direct metal deposition process enable full contact between the outer sheath and the graphite substrate.

In accordance with one or more embodiments or any of the laser direct metal deposition method embodiments above, the graphite substrate can include a rectangular box shape or a cylindrical shape.

In accordance with one or more embodiments or any of the laser direct metal deposition method embodiments above, the laser scanning of outer sheath can be performed on a surface of the outer sheath with a pre-defined laser power to melt the surface and form a bond with the graphite substrate.

In accordance with one or more embodiments or any of the laser direct metal deposition method embodiments above, the laser scanning can enable entrapped air between the surface of the outer sheath and the graphite surface escapes.

In accordance with one or more embodiments, any of the above method embodiments can be implemented as a system and/or apparatus.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
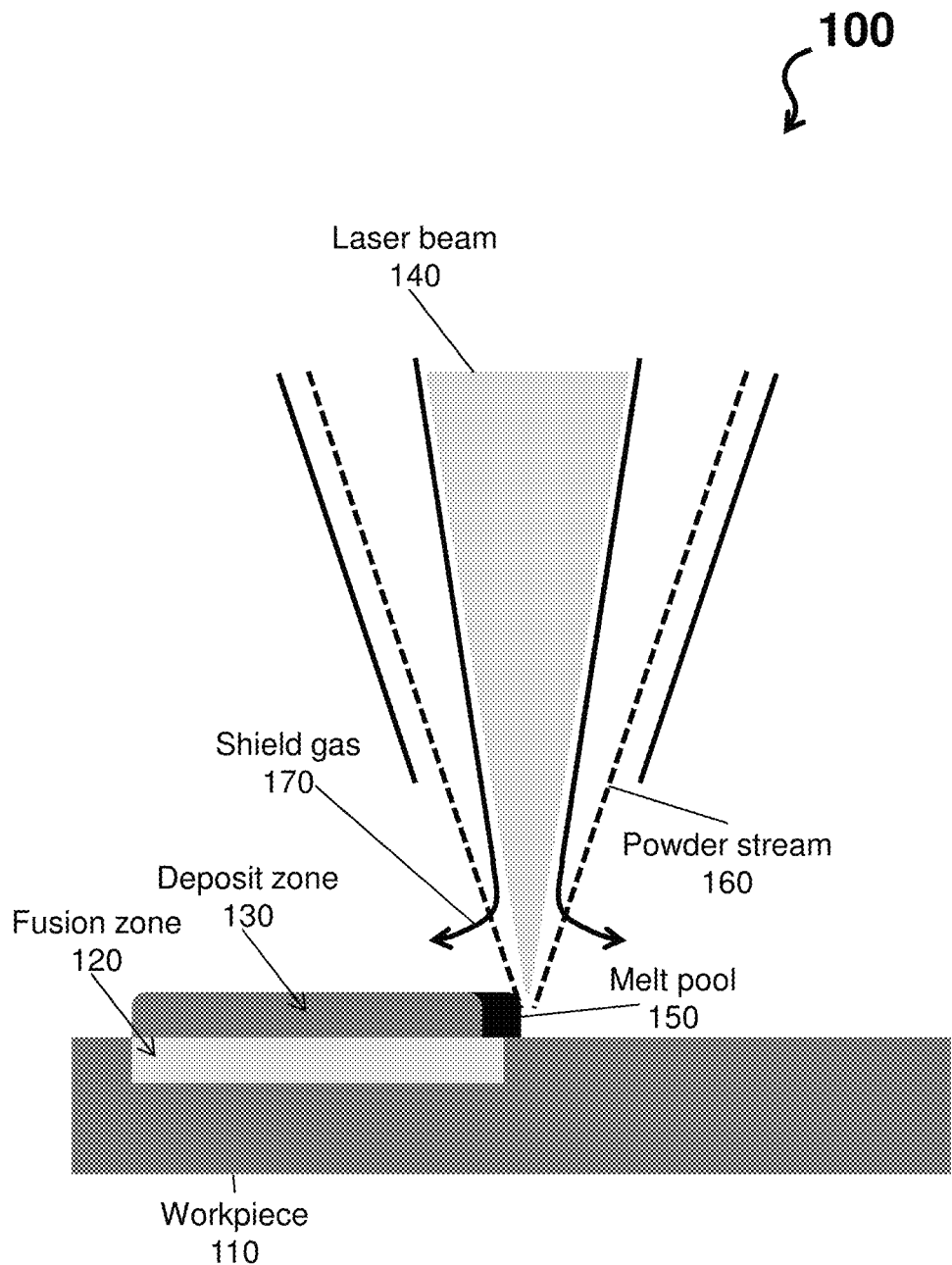
FIG. 1 depicts a schematic of laser metal deposition in accordance with one or more embodiments.

FIG. 1 depicts a schematic 100 of laser direct metal deposition in accordance with one or more embodiments. As shown in FIG. 1, the schematic comprises a workpiece 110, a fusion zone 120, a deposit zone 130, and a melt pool 150. Further, the schematic also comprises a laser beam 140, a powder stream 160, and a shield gas 170. The operations of the schematic 100 are described with respect to FIGS. 2-5.

Figure 2:
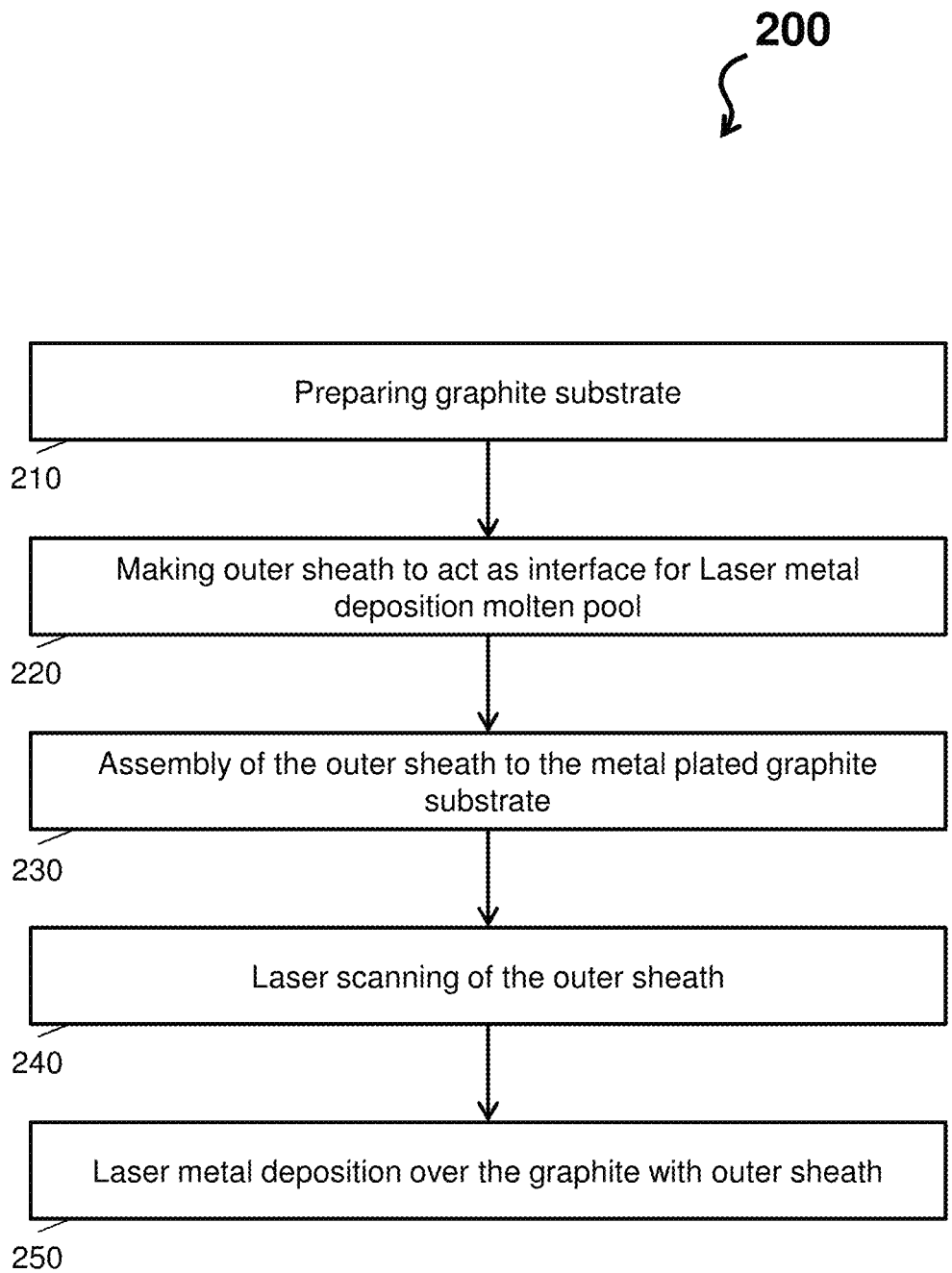
FIG. 2 depicts a laser direct metal deposition process flow on graphite substrate in accordance with one or more embodiments.

FIG. 2 depicts a laser direct metal deposition process flow 200 on a graphite substrate in accordance with one or more embodiments. In general, the laser direct metal deposition process flow 200 is a deposit of metal on graphite forms by covering a graphite substrate with a thin metal sheath before the metal deposition.

The laser direct metal deposition process flow 200 beings at block 210, where a graphite substrate (e.g., the workpiece 110 of FIG. 1) is prepared. The graphite substrate can be prepared with or without metal plating. Further, the metal plating can include metals, such as Nickel or Chromium, to prevent oxidation and to get a metal coating that enables a bonding while performing the remaining operations of the laser direct metal deposition process flow 200.

At block 220, an outer sheath is made to act as interface for laser metal deposition molten pool (e.g., the melt pool 150 of FIG. 1). A metallic interface metal, such as thin Nickel sheet metal or foil of suitable thickness, is selected and pre-formed to make an outer sleeve/sheath cover.

At block 230, the outer sheath is assembled by sliding over the graphite substrate. For instance, a Nickel sheath (or sleeve) is placed on the graphite substrate. The outer sheath's thickness can be determined based on a thickness of the melt pool 150 of FIG. 1 required for a particular laser power in a laser metal deposition process specific to the workpiece 110 of FIG. 1. The sheath itself can also be made separately from metal powders (e.g. Nickel) using a laser metal deposition process. Note that the outer sheath can be held in place over the graphite substrate during laser direct metal deposition process. For instance, mechanically restraining the metal sheath 310, 410 of FIGS. 3 and 4 onto the graphite substrate 310, 420 of FIGS. 3 and 4 enables all surfaces to be in perfect contact. The exposed graphite surfaces (shown in FIGS. 3 and 4) are covered with end caps for further deposition.

Figure 3:
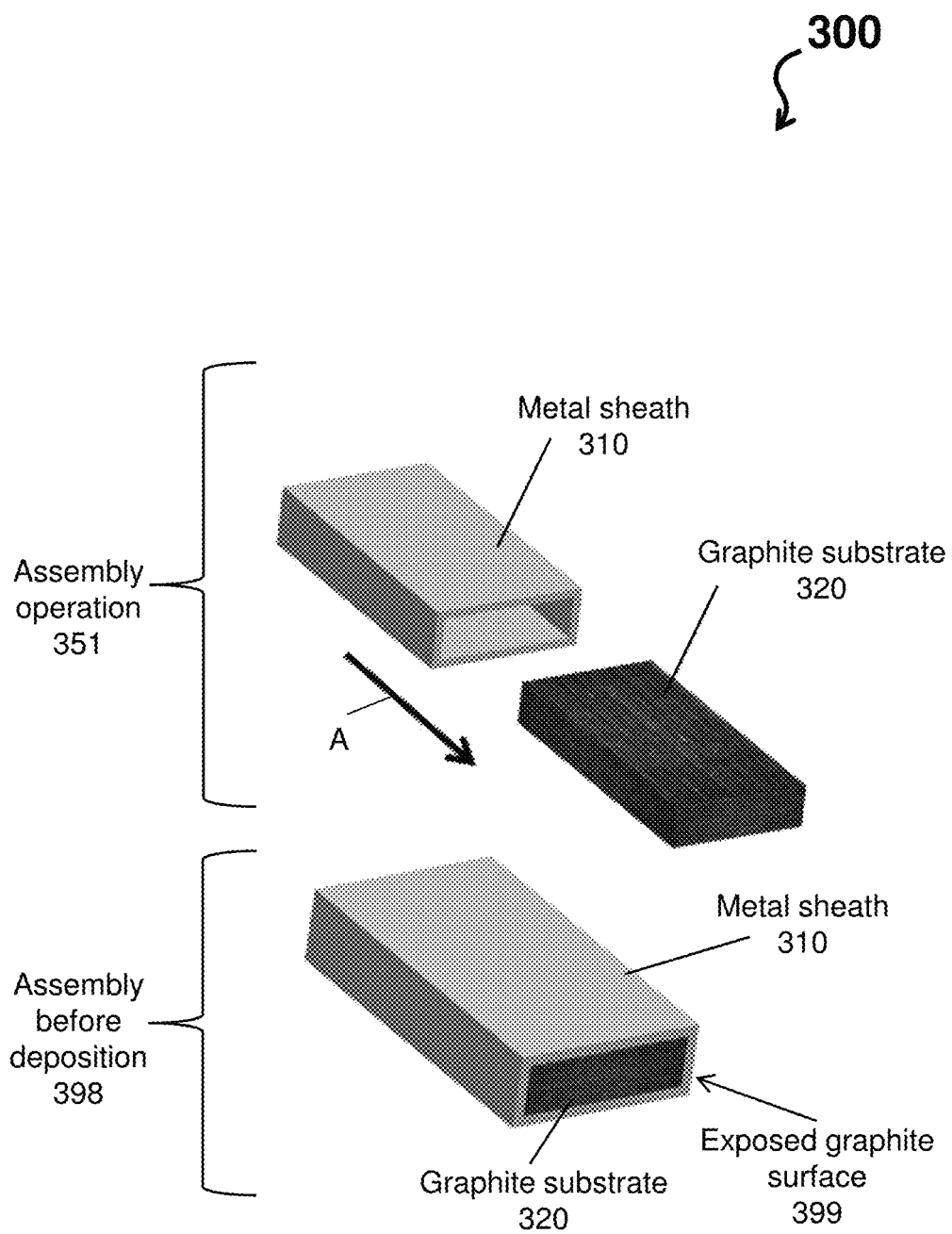
FIG. 3 depicts a schematic of a metallic interface held in position in accordance with one or more embodiments.
Figure 4:
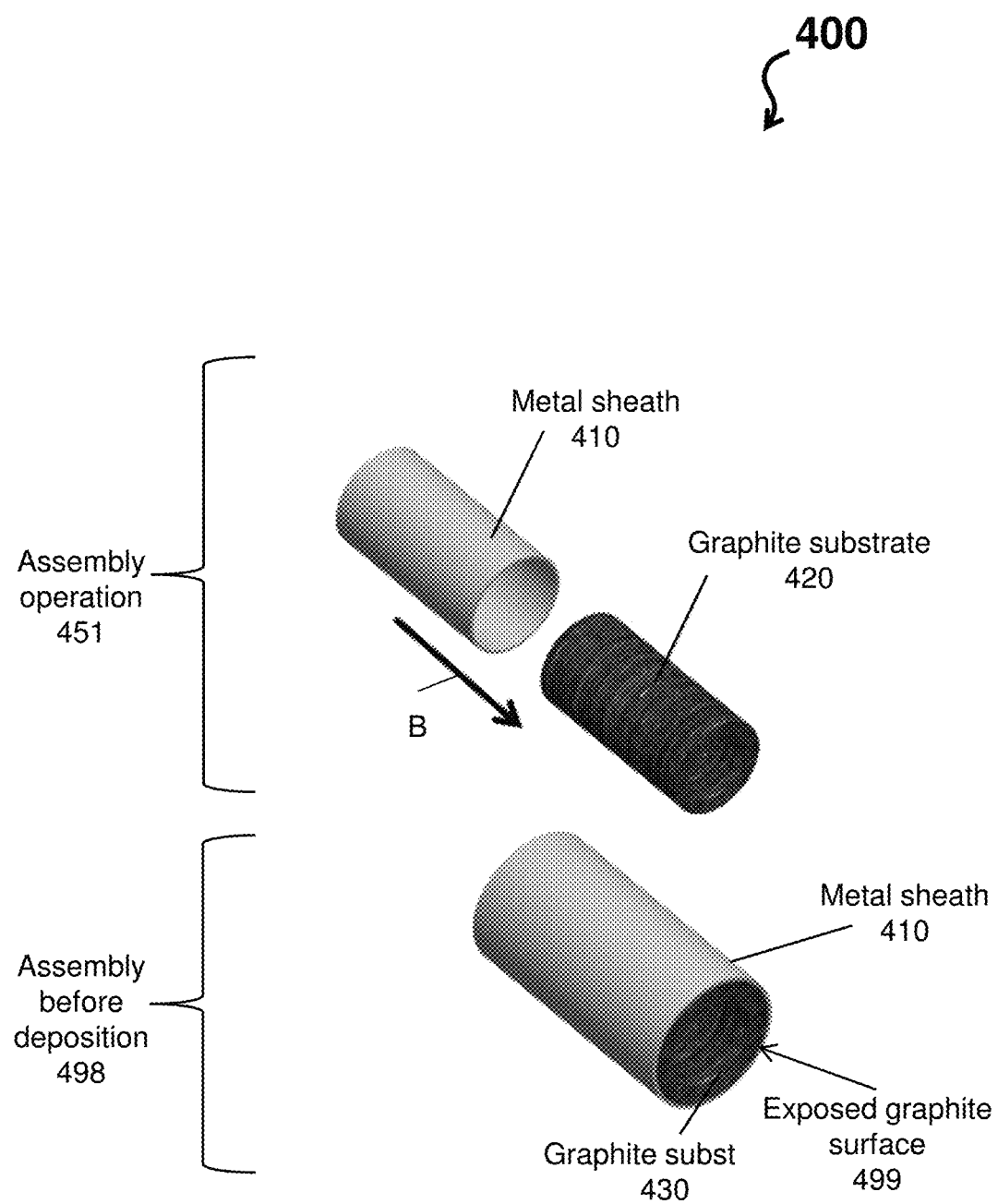
FIG. 4 depicts a schematic of a metallic interface held in position in accordance with one or more embodiments.

Turning now to FIGS. 3 and 4, example schematics 300 and 400 of a metallic interface held in position are shown in accordance with one or more embodiments. The schematic 300 depicts a metal sheath 310 and a graphite substrate 320 (e.g., a rectangular box shape). During an assembly operation 351, the metal sheath 310 slides over the graphite substrate 320 (as shown by Arrow A) to create the assembly before the deposition 398 with an exposed graphite surface 399. The schematic 400 depicts a metal sheath 410 and a graphite substrate 420 (e.g., a cylindrical shape). During an assembly operation 451, the metal sheath 410 slides over the graphite substrate 420 (as shown by Arrow B) to create the assembly before the deposition 498 with an exposed graphite surface 499. Note that while two configurations are shown in FIGS. 3 and 4, other complex shapes are contemplated.

At block 240, laser scanning of outer sheath is performed once the metallic interface/sheath is held in place over the graphite substrate. For instance, the laser scanning can be done on the sheath surface with pre-defined laser power to melt the metallic interface/sheath so that it forms a bond with the (e.g., Nickel) plating on the graphite substrate (e.g., the workpiece 110 of FIG. 1). In the case of graphite substrate without the metallic coating, the laser scanning ensures localized melting of the sheath and enables contact between the sheath and graphite substrate. The laser scanning scheme also enables/ensures the entrapped air between the metallic interface and graphite surface to escape (e.g., the surface of the outer sheath and the graphite surface escapes). And if required, the entrapped air also can be removed by doing the laser scan in vacuum; thereby continuous or full contact can be achieved between the molten sheath and graphite. A metal powder stream (e.g., the powder stream 160 of FIG. 1) could also be activated at a lesser flow rate while doing the melting of the metallic interface by laser scanning process.

At block 250, a laser metal deposition over the graphite with the outer sheath is performed. The assembly from block 250 can be verified for proper interface contact by X-ray or any other means. Thereafter, the meal deposition can be carried out in further layers with the standard laser deposition process.

Figure 5:
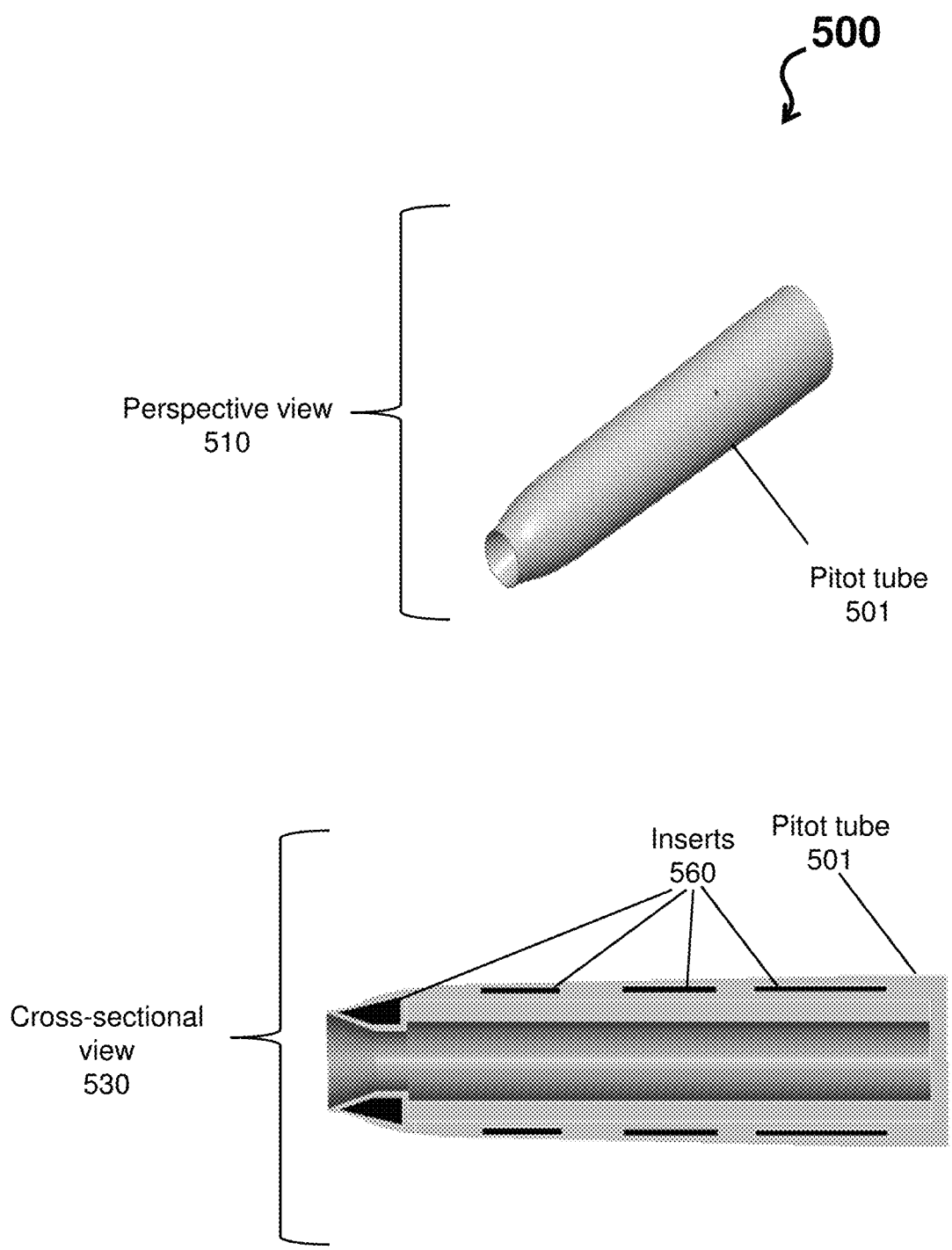
FIG. 5 depicts a schematic of an application of annealed pyrolitic graphite in Pitot tube in accordance with one or more embodiments.

FIG. 5 depicts a schematic 500 of an application of annealed pyrolitic graphite in Pitot tube 501 in accordance with one or more embodiments. The schematic 500 a perspective view 510 and a cross-sectional view 530. In the cross-sectional view 530, inserts 560 of graphite substrates within the Pitot tube 501 according to embodiments herein.

In accordance with one or more embodiments, the laser direct metal deposition process flow 200 on a graphite substrate can be applied in manufacturing of hybrid material air data probes, heat sinks, electronic enclosure, and the like that require enhanced thermal properties. The technical effects and benefits of the one or more embodiments herein include no annealed pyrolitic graphite oxidation due to coated/electroplated annealed pyrolitic graphite surface during laser direct metal deposition process; continuous or full surface to surface contact between graphite substrate and encapsulate material with complex shapes; and high thermal conductivity of the hybrid structure (with the annealed Pyrolitic graphite). Note that the heating performance method can also be applied to materials that do not create a melt pool with a laser application.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A laser direct metal deposition method for a graphite substrate, the laser direct metal deposition method comprising:
    creating an assembling by sliding an outer sheath over the graphite substrate;
    performing a laser scanning of the outer sheath; and
    performing a laser metal deposition over the graphite substrate with the outer sheath.

2. The laser direct metal deposition method of claim 1, wherein the graphite substrate is prepared without metal plating.

3. The laser direct metal deposition method of claim 1, wherein the graphite substrate is prepared by plating with one or more metals including Nickel or Chromium to prevent oxidation.

4. The laser direct metal deposition method of claim 1, wherein the outer sheath acts as interface for a laser metal deposition molten pool.

5. The laser direct metal deposition method of claim 1, wherein the outer sheath comprises a metallic interface metal.

6. The laser direct metal deposition method of claim 1, wherein a thickness of the outer sheath is determined based on a thickness of a melt pool.

7. The laser direct metal deposition method of claim 1, wherein the outer sheath is mechanically restrained in place over the graphite substrate during the laser direct metal deposition method enable full contact between the outer sheath and the graphite substrate.

8. The laser direct metal deposition method of claim 1, wherein the graphite substrate comprises a rectangular box shape or a cylindrical shape.

9. The laser direct metal deposition method of claim 1, wherein the laser scanning of outer sheath is performed on a surface of the outer sheath with a pre-defined laser power to melt the surface and form a bond with the graphite substrate.

10. The laser direct metal deposition method of claim 1, wherein the laser scanning enables entrapped air between the surface of the outer sheath and the graphite substrate to escape.

\* \* \* \* \*